Jan. 29, 1957
L. SOKOL
2,779,815
POWER LINE INSULATOR CLAMP
Filed July 31, 1953
2 Sheets-Sheet 1
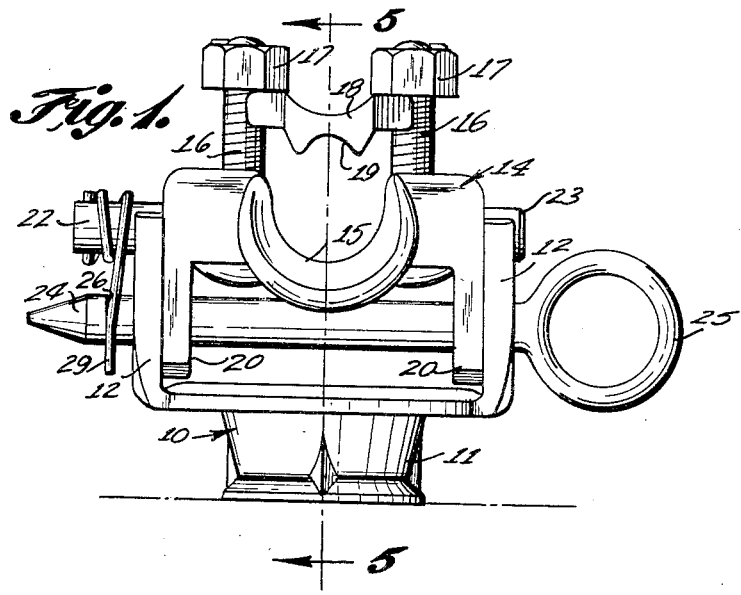
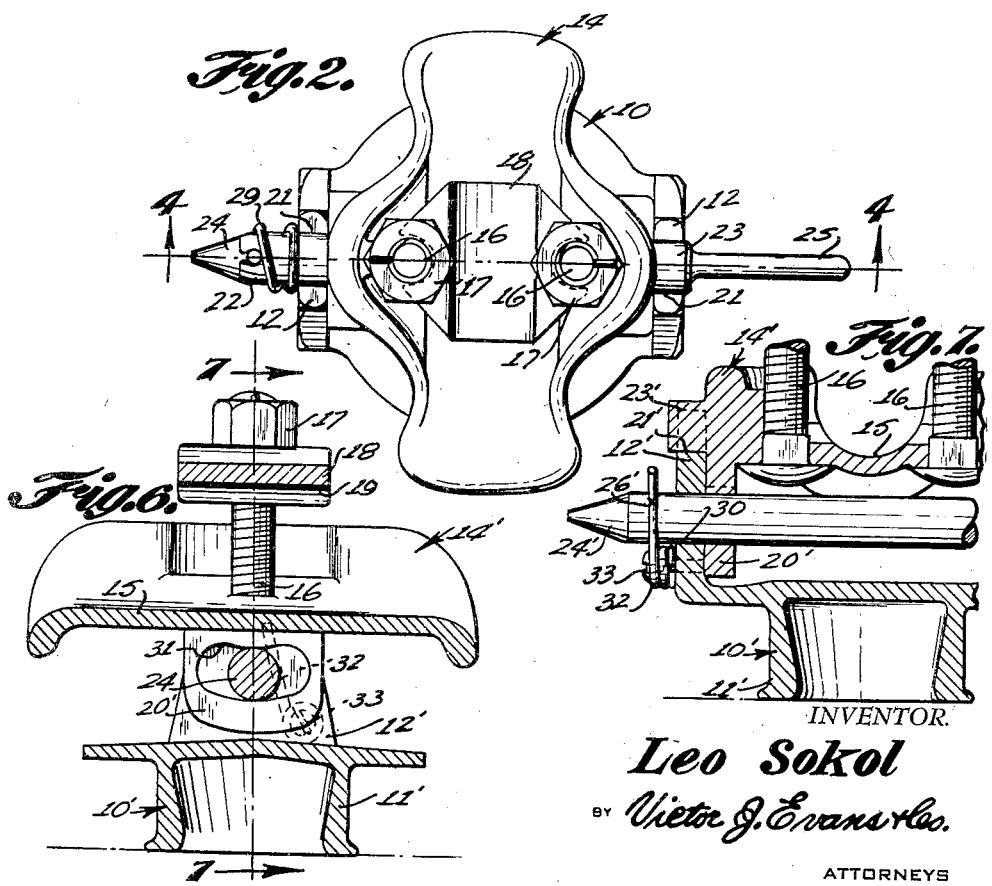
INVENTOR.
Leo Sokol
BY Victor J. Evans & Co.
ATTORNEYS Jan. 29, 1957 L. SOKOL 2,779,815
POWER LINE INSULATOR CLAMP
Filed July 31, 1953 2 Sheets-Sheet 2
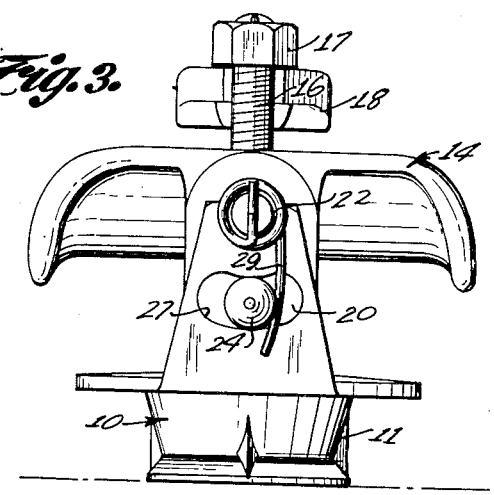
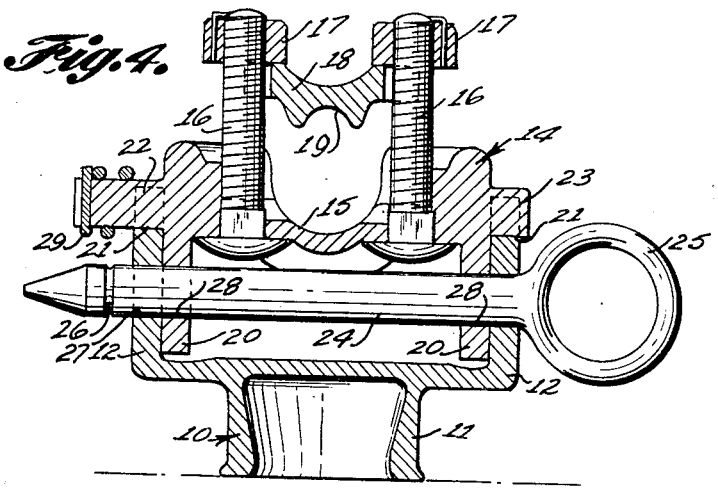
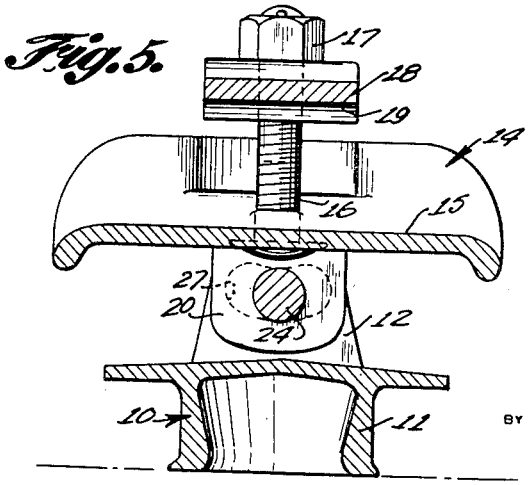
INVENTOR.
Leo Sokol
BY Victor J. Evans & Co.
ATTORNEYS

United States Patent Office 2,779,815
Patented Jan. 29, 1957

2,779,815

POWER LINE INSULATOR CLAMP

Leo Sokol, Columbus, Nebr.

Application July 31, 1953, Serial No. 371,528

4 Claims. (Cl. 174—169)

This invention relates to a clamp, and more particularly to a clamp for engagement with a power line.

The object of the invention is to provide a clamp which is adapted to be used for connecting power lines and the like to poles or other supporting structures.

Another object of the invention is to provide a power line insulator clamp which is constructed so that parts which need replacement can be easily and quickly replaced, as when such parts are damaged by lightning and the like.

A further object of the invention is to provide a power line insulator clamp which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the power line insulator clamp, constructed according to the present invention.

Figure 2 is a top plan view of the clamp.

Figure 3 is an end elevational view of the clamp.

Figure 4 is a sectional view taken on the line 4—4 of Figure 2.

Figure 5 is a sectional view taken on the line 5—5 of Figure 1.

Figure 6 is a sectional view showing a modified clamp wherein the slots are arranged upon the inner members instead of the outer members.

Figure 7 is a sectional view taken on the line 7—7 of Figure 6.

Referring in detail to the drawings, the numeral 10 designates a base which may be fabricated of any suitable material, and the base 10 includes a depending sleeve 11 for engagement with a suitable insulator. Formed integral with the base 10 or secured thereto is a pair of spaced parallel lugs 12, Figure 4. Rockably or pivotally connected to the base 10 is a bracket or body member 14.

The body member 14 includes an arcuate saddle 15 for receiving a suitable power line therein. Extending upwardly from the body member 14 is a pair of spaced parallel bolts or securing elements 16. A nut 17 is arranged in threaded engagement with each of the bolts 16, and adjustably mounted between the pair of bolts 16 is a clamp 18. The clamp 18 includes an inner arcuate surface 19 for engagement with a portion of the power line, and the clamp 18 is mounted for movement toward and away from the saddle 15 so as to clamp various sizes of power lines therebetween. The clamp 18 is adapted to be held immobile in its various adjusted positions by means of the nuts 17. Since the body member 14 which carries the power line is pivotally connected to the base 10, the power line will be able to sway or move slightly during wind storms and the like so that the chances of breakage of the parts will be minimized. A suitable insulator which may be connected to a pole may be arranged in engagement with the hollow space in the sleeve 11.

A means is provided for pivotally connecting the body member 14 to the base 10. This means comprises a pair of spaced parallel ears 20 which depend from the body member 14, the ears 20 being positioned between the pair of lugs 12. The upper surface of each of the lugs 12 is provided with a recess or cut-out 21, and extending outwardly from the body member 14 is a pair of diametrically opposed studs 22 and 23. The stud 22 is slightly longer than the stud 23, Figure 4, and these studs rockably seat in or engage the recesses 21.

A pin 24 is provided for pivotally connecting the parts together, and the pin 24 includes a ring 25 on one end which facilitates the manual handling of the pin. The pin is provided with an annular groove 26 adjacent its other end, and the groove 26 is adapted to be engaged by a portion of a spring member 29 which is mounted on the stud 22, the spring member 29 serving to maintain the pin 24 immobile in its operative position so that accidental disengagement of the pin is prevented.

In the form of the invention shown in Figures 1–5, each of the upstanding lugs 12 is provided with a slot 27. Further, in this form of the invention each of the ears 20 is provided with a circular opening 28, and the slots 27 and openings 28 are arranged in registry with each other for the projection therethrough of the pin 24. This registering arrangement of the slots and openings permits the body member 14 to rock or pivot on the base 10.

In Figures 6 and 7 there is shown a slightly modified form of the invention. The form of the invention shown in Figures 6 and 7 includes a base 10' which has a sleeve 11' for engagement with an insulator, and extending from the base 10' is a pair of spaced parallel lugs 12'. The numeral 14' indicates the body member, which is pivotally connected to the base 10', and the body member 14' includes a pair of spaced parallel ears 20'. The lugs 12' are each provided with a circular opening 30 which registers with an elongated slot 31 in the ears 20'. It will be seen therefore, that in Figures 6 and 7 the slots and openings are reversed or in the opposite parts from that shown in Figures 1 and 4. However, the result accomplished is the same, that is it provides a means whereby the body member which carries the power line is pivotally connected to the base. For maintaining the pin 24 immobile in its operative position in the form of the invention shown in Figures 6 and 7, a spring member 32 is mounted on a bolt or screw 33, and the spring member 32 is again adapted to engage the annular groove 26 in the pin 24.

From the foregoing it is apparent that a power line insulator clamp has been provided. In use the usual insulator from a pole or other supporting structure can be arranged in engagement with the sleeve 11 or 11' so that the base remains stationary. The power line or wire to be supported is clamped between the saddle 15 and the arcuate surface 19. The nut 17 can be tightened on the bolt 16 to maintain the clamp 18 tight or in clamping engagement with the power line. The device is shown in its assembled position in the drawings and it will be seen that the pin 24 extends through the registering slots and openings in the ears and lugs and is held therein by means of the spring member arranged in engagement with the groove 26. This construction permits the body member 14 to sway or rock with respect to the base so that breakage of the parts will be minimized as during wind storms and the like. In the event that the insulator in the sleeve 11 or 11' becomes cracked or damaged as from lightning, it is only necessary to move the spring member out of engagement with the groove 26 and then withdraw the pin 24 by gripping the ring 25. With the pin 24 removed, the body member 14 and base 10 can be separated. Even though these parts may be separated the power line is still clamped in the body member 14 so that it is only necessary to replace the base on the insulator and then reinsert the pin 24 through the registering openings and slots so that the clamp is immediately ready for use.

The arrangement of the slots and openings permits the body member or bracket 15 to swivel on the base so that if lightning happens to hit the insulator and cracks it or if the insulator gets cracked for any other reason, it is not necessary for the linemen to loosen the bolts or nuts 17 on the wire being clamped. Thus, it is only necessary to pull out the pin 24, lift up the wire and then unscrew the insulator which has been damaged and screw in the new insulator and then the body member 14 will readily fit into the new base. Then, by putting the pin back in the repair job is completed.

It will be seen that the slots can be provided as at 27 in the outer lugs 12 or else as shown in Figure 6 and 7 the slots 31 can be provided in the inner ears 20'. In Figures 6 and 7 the body member 14' has diametrically opposed studs 23' for rockably seating in or engaging recesses 21' in the lugs 12'.

I claim:

1. A power line insulator clamp, comprising a base, a hollow sleeve depending from said base, a body member mounted on said base, means pivotally connecting said body member to said base, said body member being provided with an arcuate saddle for receiving a power line, a pair of spaced parallel securing elements extending upwardly from said body member and secured thereto, a clamp adjustably mounted on said securing elements and having an arcuate surface for engagement with the power line, said means comprising a pair of spaced parallel lugs extending from said base, the outer end of each of said lugs being provided with a recess, a pair of diametrically opposed studs extending from said body member and seated in said recesses, a pair of spaced parallel ears depending from said body member and interposed between said lugs, a pin extending through said lugs and ears, a finger engaging ring arranged on an end of said pin, said pin being provided with an annular groove adjacent its other end, and a spring member arranged in engagement with said groove.

2. The apparatus as described in claim 1, wherein said lugs are each provided with registering slots, and said ears are provided with openings, said pin extending through said slots and openings.

3. The apparatus as described in claim 1, wherein said lugs have circular openings, and said ears have elongated slots, said pin extending through said slots and openings.

4. In a power line insulator clamp, a base, a hollow sleeve depending from said base, a body member mounted on said base, means pivotally connecting said body member to said base, said body member being provided with an arcuate saddle for receiving a power line, a pair of spaced parallel securing elements extending upwardly from said body member and secured thereto, nuts arranged in threaded engagement with the upper ends of said securing elements, a clamp adjustably mounted on said securing elements and having an inner arcuate surface for engagement with the power line, said means comprising a pair of spaced parallel lugs extending from said base, the outer end of each of said lugs being provided with a recess, first and second diametrically opposed studs extending from said body member and rockably seated in said recesses, said second stud being longer than said first stud, a pair of spaced parallel ears depending from said body member and interposed between said lugs, a pin extending through said lugs and ears, a finger engaging ring arranged on an end of said pin, said pin being provided with an annular groove adjacent its other end, and a spring member mounted on said second stud and arranged in engagement with said groove, said lugs being provided with registering slots, said ears being provided with openings, said pin extending through said slots and openings.

References Cited in the file of this patent
UNITED STATES PATENTS

| | | |
|---|---|---|
| 1,334,802 | Schneider | Mar. 23, 1920 |
| 1,630,423 | Gothberg | May 31, 1927 |
| 2,407,961 | Matthysse | Sept. 17, 1946 |